United States Patent [19]

Tanaka

[11] Patent Number: 4,967,129
[45] Date of Patent: Oct. 30, 1990

[54] POWER SYSTEM STABILIZER

[75] Inventor: Seiichi Tanaka, Hyogo, Japan

[73] Assignee: Mitsubishi Denki Kabushiki Kaisha, Tokyo, Japan

[21] Appl. No.: 224,458

[22] Filed: Jul. 26, 1988

[30] Foreign Application Priority Data

Sep. 19, 1987 [JP] Japan .................. 62-235615

[51] Int. Cl.$^5$ .............................................. G05B 6/02
[52] U.S. Cl. ...................................... 318/621; 322/20; 322/58
[58] Field of Search ............... 318/621, 622, 616, 623; 322/19, 20, 22, 32, 58; 324/77 B

[56] References Cited

U.S. PATENT DOCUMENTS

| | | | |
|---|---|---|---|
| 3,673,512 | 6/1972 | Walters | 318/621 |
| 4,080,559 | 3/1978 | Wright et al. | 322/58 |
| 4,438,386 | 3/1984 | Gyugyi | 322/32 |
| 4,642,541 | 2/1987 | El-Sadi | 318/621 |
| 4,733,156 | 3/1988 | Tanaka et al. | 322/58 |
| 4,741,023 | 4/1988 | Lawson | 322/99 |

FOREIGN PATENT DOCUMENTS 53-44204 11/1978 Japan .
61-280714 12/1986 Japan .

OTHER PUBLICATIONS

Society of Electrical Cooperative Research, vol. 34, No. 5, pp. 223-226.

Primary Examiner—David Smith, Jr.
Attorney, Agent, or Firm—Bernard, Rothwell & Brown

[57] ABSTRACT

A power system stabilizer (PSS) to bring the constant in a phase lead-lag circuit of the PSS to an optimum value by having such procedures carried out in its phase lead-lag compensation circuit as to apply the ruler to lead the phase of the PSS when the period of the power fluctuation in each mode tends to decrease and to lag the phase of the PSS when conversely the period tends to increase by means of a fuzzy inference device to detect results of the periods weighted by the degrees of the tendency, to superpose the outputs obtained by application of the rule to obtain the center of gravity, and therewith finally to vary the constant in the amplification and phase lead-lag circuit of the PSS.

4 Claims, 4 Drawing Sheets

FIRST POWER FLUCTUATION MODE

SECOND POWER FLUCTUATION MODE

POWER FLUCTUATION WAVEFORM
INCLUDING FIRST AND SECOND MODES
(ACTUAL POWER WAVEFORM)

POWER SYSTEM STABILIZER

BACKGROUND OF THE INVENTION

1. Field of the Invention

The present invention relates to a power system stabilizer (hereinafter to be briefly called PSS) and more particularly to a PSS for use in an excitation system for a synchronous motor.

2. Description of the Prior Art

FIG. 1 is a block diagram of a general excitation system including a prior art PSS as disclosed, for example, in Japanese Patent Publication No. 53-44204.

Referring to the figure, 1 denotes an input terminal of a deviation of terminal voltage of an electric motor from its reference voltage, 2 denotes a PSS, 3 denotes an input terminal of the PSS 2, 4 denotes a damping circuit, 5 denotes an adder for deducting the output of the damping circuit 4 from the sum total of the deviation from the input terminal 1 and the output of the PSS 2, 6 denotes a regulator for controlling an exciter 7 based upon the output of the adder circuit 5, and 7 denotes the exciter controlled by the regulator 6 and supplying field voltage to the motor (not shown). Denoted by 2a is a filter circuit for determining the response range of the PSS 2 to the input signal 3, which generally has a transfer function characteristic expressed as $$\frac{T_R S}{1 + T_R S} \cdot \frac{1}{1 + T_H S}$$

Denoted by 2b is a portion for compensating for time-delay of the regulator 6, exciter 7, motor, and the like and is a lead-lag circuit expressed generally by the form of $$K_1 \frac{1 + T_{12} S}{1 + T_{11} S}$$

Denoted by 2c is a limiter for limiting the output signal of the PSS 2 so that it has a suitable signal level for the performance of the excitation system shown in FIG. 1 as a whole.

As the input signal to the PSS 2, the deviation in the number of revolutions of the rotor of the motor, deviation in frequency of the terminal voltage of the motor, deviation in the output power of the motor, and the like is generally used.

Operation will be described below. When the motor terminal voltage deviates from the reference value, a deviation signal is applied to the input terminal 1, and this deviation signal is amplified in the regulator 6 and input to the exciter 7. The signal is further amplified in the exciter and supplied to the field of the motor, whereby the deviation of the motor terminal voltage from the reference value is controlled to be returned to zero. The damping circuit 4 is provided for stabilizing the aforesaid voltage control. While the above is the function of what is called general automatic voltage regulator (hereinafter to be referred to as AVR), the PSS 2 is a control apparatus for providing the adder 5 of the aforesaid excitation system with a properly amplified and compensated auxiliary signal (for example, deviation in number of revolutions of the rotor of the motor) thereby to improve stability of the power system.

Now, let us think about a PSS taking in the number of revolutions of the rotor of a motor as input thereto. Detected deviation in the number of revolutions is applied to the input terminal 3 of the PSS. The signal is made free of D.C. component and high frequency component in the filter 2a and applied to the compensating circuit 2b so as to be properly amplified and compensated for its phase. The signal is then limited in the limiter 2c to a level not exceeding a suitable signal level for the excitation system and applied to the adder 5, whereby the output voltage of the exciter 7 is controlled so that the power swing of the rotor of the motor is suppressed.

The working principle of the PSS will be described below. FIG. 2 is a block diagram showing linear approximation of fluctuation in a motor in a single-machine infinite bus system as described, for example, in "THE SOCIETY OF ELECTRICAL COOPERATIVE RESEARCH", Vol. 34, No. 5. Referring to the figure, $K_1$ represents a coefficient of synchronizing torque produced by a motor whose field flux linkage is constant, $K_1'$ represents a coefficient of synchronizing torque produced by the AVR, $K_1''$ represents a coefficient of synchronizing torque produced by the PSS, D represents a coefficient of damping torque produced by the motor whose field flux linkage is constant, D' represents a coefficient of damping torque produced by the AVR, and D'' represents a coefficient of damping torque produced by the PSS. Generally, when the phase angle $\theta$ becomes larger where the power factor is close to 1.0, the coefficient D' is liable to take a negative value. In the case of an AVR with high response and high gain, in particular, D +D' sometimes becomes negative, whereby the system fails to keep steady-state stability on account of lack of damping power. In such a case, stability is attained by having the PSS additionally provided to produce the damping force D''. FIG. 3 is an explanatory diagram showing such behavior. To cancel the negative damping force D' produced by an AVR having high response and high gain and thereby to improve the condition of damping force, the PSS produces damping force D'' acting in opposite direction to the negative damping force. However, the PSS has no object to improve the synchronizing force, and therefore, $K_1''$ sometimes becomes very small or, in some case, takes a small negative value.

While the prior art PSS is organized as described above, since there is existent only one mode of power fluctuation in the single-machine infinite bus system (or a system similar to it) as is the case with the above described prior art, a good result is obtained by properly executing the phase compensation of the PSS against the one mode of power swing. In an actual power system, however, there are many cases where simulating the one-machine infinite bus system is difficult. In a power system simulating double-machine infinite bus system, for example, there are existent two modes of power swing. FIG. 4 shows a waveform of power swings in which two modes are present. In the case of the two modes of power swings, the phase compensating values of the PSS in the first power swing mode and in the second power swing mode, that is, the constants in the above mentioned lead-lag circuit, do not always become equal but normally the optimum compensating values are different from each other.

Therefore, even if the phase compensation is made most suited for the first power swing mode, correct phase compensation is not provided for the second power swing mode, and as a result sufficient effects of the PSS are not obtained. Further, since the component of the first power swing mode and that of the second power swing mode contained in a power swing resulting from an external disturbance (line fault) of a power system become different depending upon disturbances, it is not expectable that most suitable phase compensation is achieved against every external disturbance (line fault). Since there have been such problems sufficient PSS effects have not been obtained.

SUMMARY OF THE INVENTION

The present invention was made to solve the problems as mentioned above. Accordingly, an object of the present invention is to provide a PSS which will make optimum phase compensation for two power swing modes or more, and which, even in the case where the contents of the multiple power swing modes are changed dependent upon the state of the external disturbance (line fault) of the power system, will automatically make optimum phase compensation and readily produce satisfactory results.

The PSS according to the present invention comprises detectors for detecting periods of each of the power fluctuation modes and a lead-lag compensation circuit, with fuzzy inference applied thereto, in response to the outputs of the detectors for adjusting the constant in a phase lead-lag circuit of the PSS, whereby the constant in the phase lead-lag circuit of the PSS is adapted to be automatically adjusted, on an on-line basis, responding to the changes in the periods of each of the power swing modes.

DETAILED DESCRIPTION OF THE PREFERRED EMBODIMENTS

Figure 5:
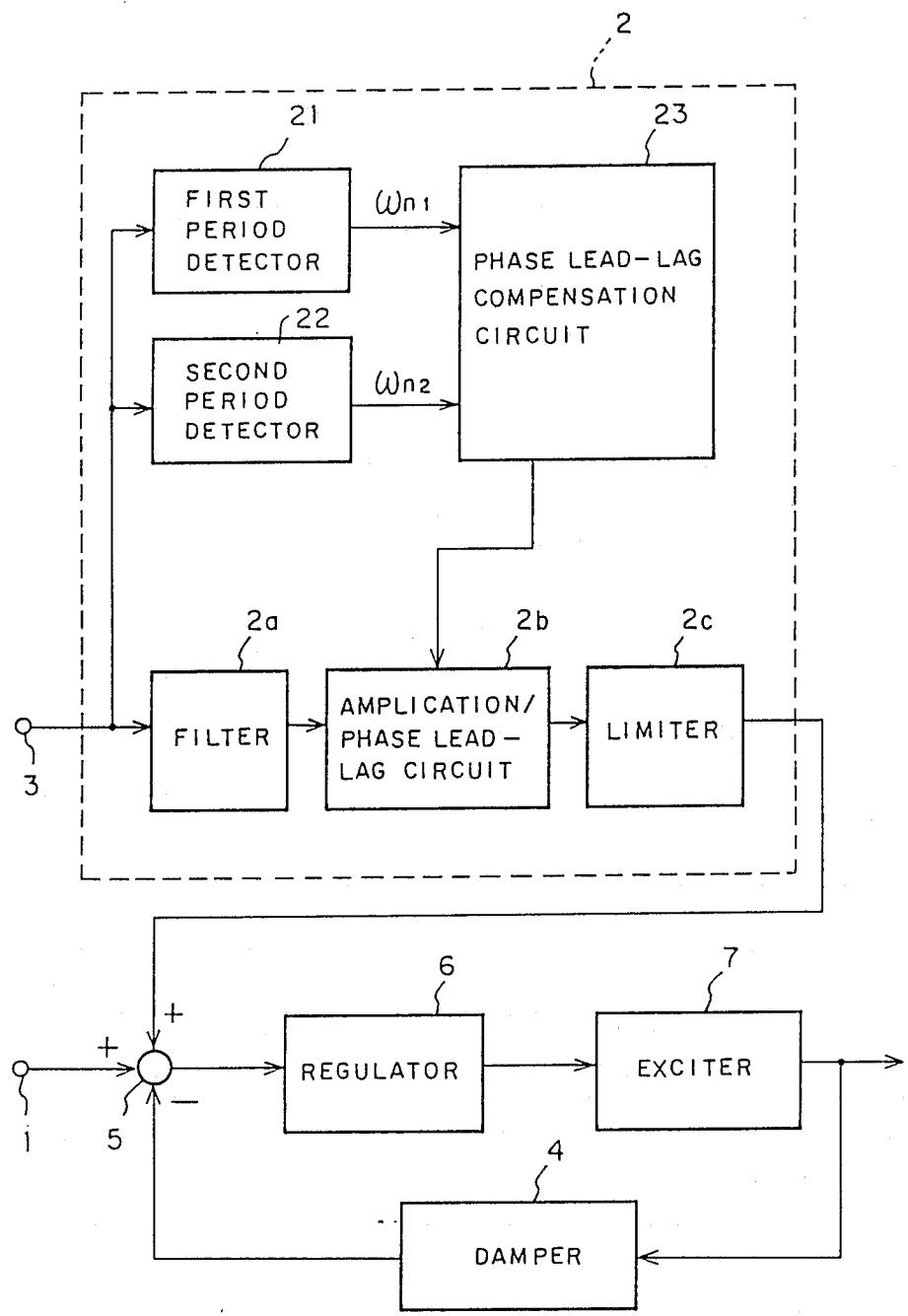
FIG. 5 is a block diagram of an excitation system with a PSS according to an embodiment of the present invention incorporated therein.
Figure 6:
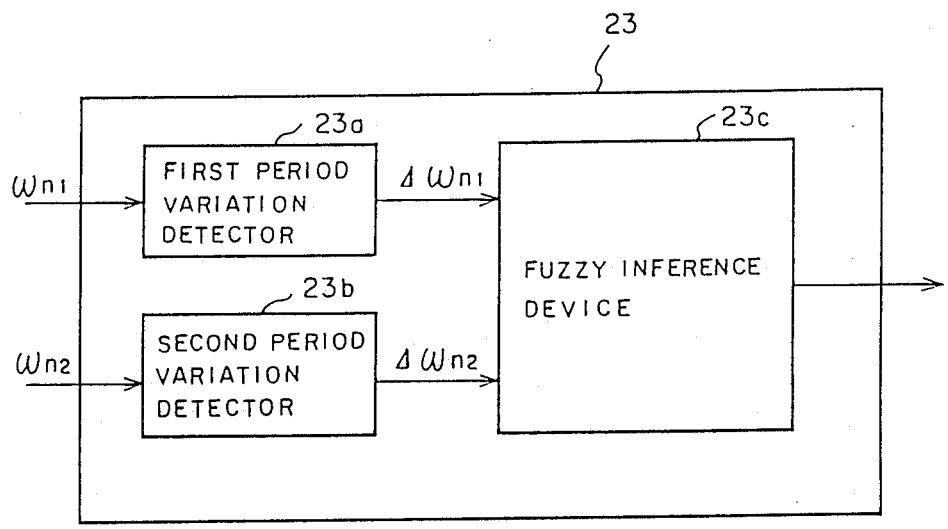
FIG. 6 is a diagram showing internal structure of a phase lead-lag compensation circuit according to an embodiment of the present invention.

An embodiment of the present invention will be described below with reference to the accompanying drawings. Referring to FIG. 5, numeral reference 21 denotes a first period detector in response to the input to a PSS 2 for detecting the period of a first power fluctuation mode, 22 denotes a second period detector for detecting, similarly to the aforesaid first period detector, the period of a second power fluctuation mode, 23 denotes a phase lead-lag compensation circuit in response to the outputs of the aforesaid first period detector 21 and second period detector 22 for adjusting the constant in a phase lead-lag circuit in an amplification and phase lead-lag circuit 2b of the PSS. FIG. 6 shows internal structure of the phase lead-lag compensation circuit. Referring to the figure, 23a denotes a first period variation detector in response to the output of the aforesaid first period detector 21 for detecting a variation in its period, 23b denotes a second period variation detector in response to the output of the aforesaid second period detector 22, similarly to the above, for detecting variation in its period, and 23c denotes a fuzzy inference device in response to the outputs of the aforesaid first and second period variation detectors 23a, 23b for outputting, through fuzzy inference, a signal to the amplification and phase lead-lag circuit 2b for compensating for the constant in the phase lead-lag circuit of the PSS.

Figure 3:
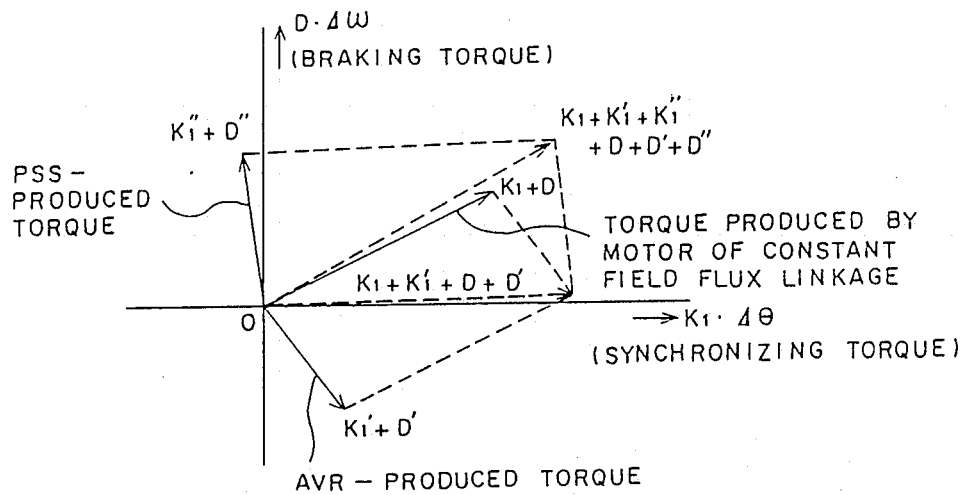
FIG. 3 is a vector diagram for explaining torque characteristics of a PSS.

Before describing operation in the following, explanation will be given about the relationship between the phase of the PSS and the period of the power swing with reference to FIG. 3. Referring to the figure, the torque $K_1'' + D''$ produced by the PSS is in a direction parallel to the $D \cdot \Delta \omega$ (damping torque) axis, and therefrom it is known that if the phase of this vector lags (which means that the vector makes a clockwise turn), the $K_1 + K_1' + K_1''$ component becomes larger by composition of vectors, and if conversely the phase of the PSS leads, the $K_1 + K_1' + K_1''$ component becomes smaller. On the other hand, the period $\omega_n$ of the power fluctuation is given by the following formula $$\omega_n = \sqrt{\frac{\omega_\theta K_1^*}{M}}$$

where $\omega_\theta$ represents a reference frequency, $K_1^*$ represents synchronizing torque $= K_1 + K_1' + K_1''$, and M represents an inertia constant. Out of them, since $\omega_\theta$ is a constant and M is constant for each motor, the period $\omega_n$ of the power swing can be said to vary with the value of $K_1^*$. From the above, as to the relationship between the phase of the PSS and the period of the power swing, it is known that the period becomes larger as the phase of the PSS lags and the period becomes smaller as the phase leads. The converse is also true.

Figure 4:
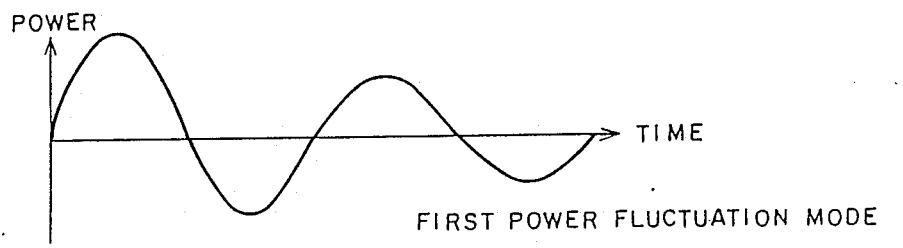
FIG. 4 is a waveform diagram in a power system where there are two modes of power swing.
Figure 4:
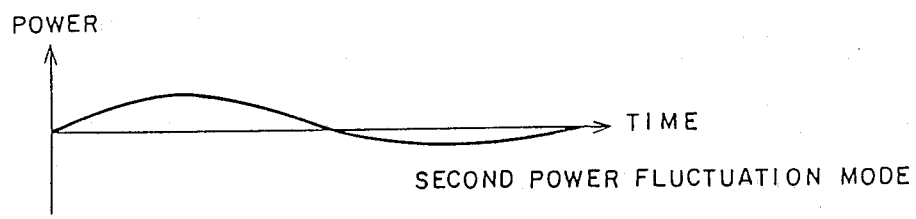
Figure 4:
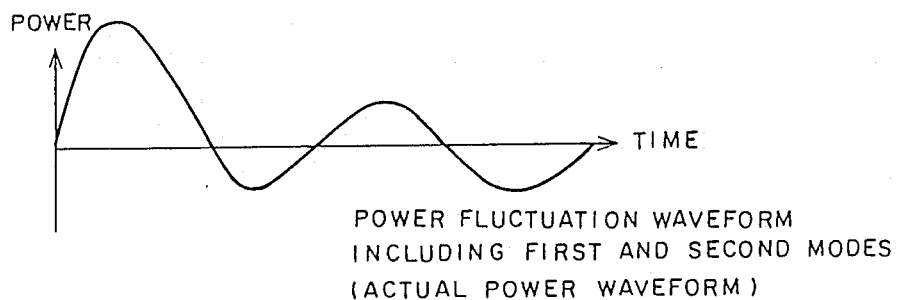
Figure 7:
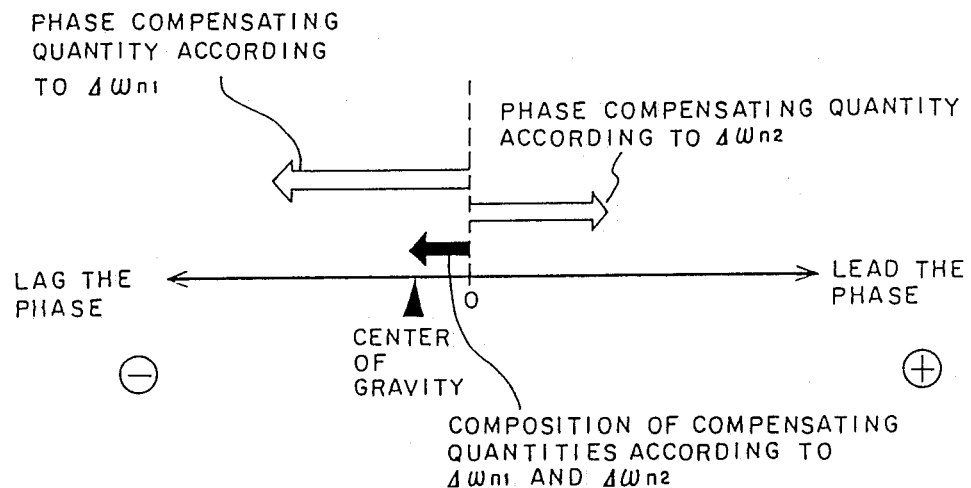
FIG. 7 is an explanatory drawing of an operating example of a fuzzy inference device according to an embodiment of the present invention.

Now, the operation will be described. The first and second period detectors 21, 22 output the component of a first power swing mode and the component of a second power swing, respectively, from an actual power waveform. The output $\omega_{n1}$ of the first period detector 21 may become as shown by the waveform of the first power swing mode in FIG. 4 and the output $\omega_{n2}$ of the second period detector 22 may become as shown by the waveform of the second power swing mode in FIG. 4. These waveforms can be easily obtained by use of fast Fourier transform or the like. These are input to the first and second period variation detectors 23a, 23b of the phase lead-lag compensation circuit 23. The first and second period variation detectors 23a, 23b deliver to the fuzzy inference device 23c their output $\Delta \omega_{n1}$, $\Delta \omega_{n2}$, respectively, each thereof being of a positive value when $\omega_{n1}$, $\omega_{n2}$ has a tendency to increase and of a negative value when the same has a tendency to decrease and corresponding in magnitude to the degree of the tendency to increase or decrease. The fuzzy inference device 23c makes a judgment as to whether the phase of the PSS should be led or lagged depending upon $\Delta \omega_{n1}$, $\Delta \omega_{n2}$. One example will be described with reference to FIG. 7. In FIG. 7, it is shown that $\Delta \omega_{n1}$ is of a negative value, that is, the period of the power swing of the first mode has a tendency to increase and that $\Delta \omega_{n2}$ is of a positive value, that is, the period of the power swing of the second mode has a tendency to decrease. These as they are can be taken up as phase compensating quantities for compensating for the phase of the PSS, and the constant in the amplification and phase lead-lag circuit 2b of the PSS will be varied according to the composition of the two phase compensating quantities. Of course, the described procedure is theoretically based upon fuzzy inference.

Although, in the above described embodiment, two sets of detectors such as the first and second period detectors 21, 22 and the first and second period variation detectors 23a, 23b were used for the first and second power swing modes, there may be provided three sets of detectors for first, second, and third power swing modes, or above. And, although as the amplification and phase lead-lag circuit 2b, that of one-circuit structure was mentioned, it can be of two-circuit structure or above. Although, the above embodiment was described as an analog apparatus, it can be a digital apparatus for providing the same effects.

Since, in the present invention as described so far, the PSS is provided with the period detectors and the phase lead-lag compensation circuit with fuzzy inference applied thereto, it has been made possible to make automatic adjustment of the phase lead-lag circuit of the PSS for multiple power swing modes optimally and on the on-line basis. Therefore, such effects are obtained that satisfactory PSS functions are achieved and a turningless-PSS can be produced.

What is claimed is:

1. A power system stabilizer comprising:
   a plurality of period detectors connected to a dynamoelectric machine to sense at least one variable parameter therein for detecting the periods of a plurality of power swing modes in said dynamoelectric machine;
   a phase lead-lag compensation circuit including a plurality of period variation detectors connected to said period detectors for detecting variations in the periods of said power swing modes and further including fuzzy inference means connected to receive the outputs of said period variation detectors for producing a phase lead-lag compensating signal as a function of the signals received from said period variation detectors in accordance with a predetermined relationship based on fuzzy inference; and
   an amplication and phase lead-lag circuit connected to said phase lead-lag compensation circuit and being further connected to control means for controlling said at least one variable parameter for compensating the phase of said power system stabilizer in accordance with said phase lead-lag compensating signal.

2. A power system stabilizer according to claim 1, wherein said variable parameter is the output of said dynamoelectric machine.

3. A power system stabilizer according to claim 1, wherein said variable parameter is the rotational speed of said dynamoelectric machine.

4. A power system stabilizer according to claim 1, wherein said variable parameter is the frequency of the system.

* * * * *

UNITED STATES PATENT AND TRADEMARK OFFICE
CERTIFICATE OF CORRECTION

PATENT NO. : 4,967,129

DATED : October 30, 1990

INVENTOR(S) : Seiichi Tanaka

Figure 1:
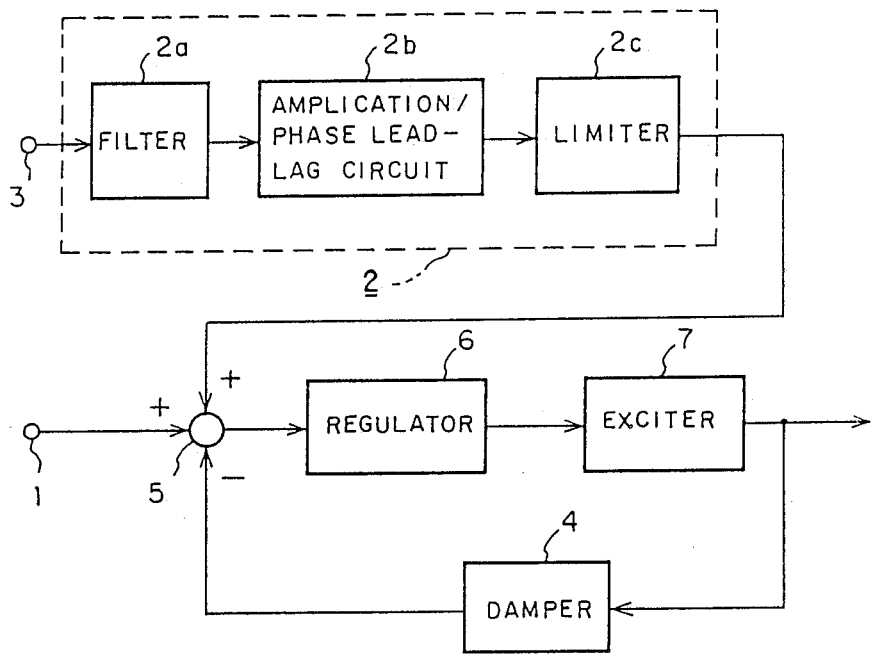
FIG. 1 is a block diagram of a general excitation system with a prior art PSS incorporated therein.
Figure 2:
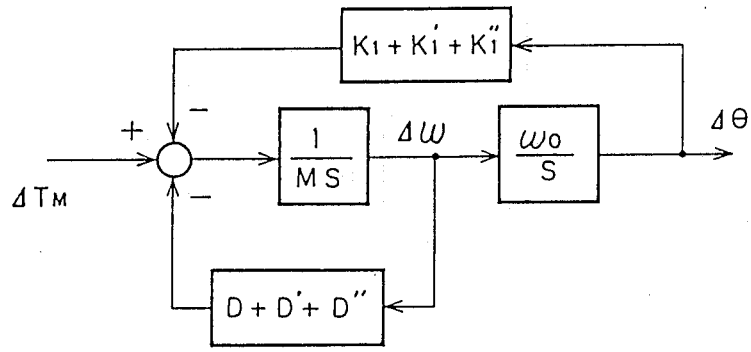
FIG. 2 is a block diagram of a linear approximation of the fluctuation of a motor in the single-machine infinite bus system.

It is certified that error appears in the above-identified patent and that said Letters Patent is hereby corrected as shown below:

In the Drawings, Sheet 1 of 4, FIG. 1, "AMPLICATION/" should be --AMPLIFICATION/--;

Sheet 3 of 4, FIG. 5, "AMPLICATION/" should be --AMPLIFICATION/--.

Column 6, line 16, "amplication" should be --amplification--.

Signed and Sealed this

Fourth Day of August, 1992

Attest:

DOUGLAS B. COMER

*Attesting Officer*　　　*Acting Commissioner of Patents and Trademarks*